United States Patent [19]

Satterwhite et al.

[11] 4,145,310

[45] * Mar. 20, 1979

[54] DEFOAMER FOR HIGH STRENGTH ACID MEDIA

[75] Inventors: William A. Satterwhite, Englishtown; Robert M. Leach, Cranbury; Harold A. Stuhler, Browns Mills, all of N.J.

[73] Assignee: Cities Service Company

[*] Notice: The portion of the term of this patent subsequent to Dec. 27, 1994, has been disclaimed.

[21] Appl. No.: 828,781

[22] Filed: Aug. 29, 1977

Related U.S. Application Data

[63] Continuation of Ser. No. 664,595, Mar. 8, 1976, abandoned.

[51] Int. Cl.² .............................................. B01D 19/04
[52] U.S. Cl. ..................................... 252/358; 252/321
[58] Field of Search ................ 252/321, 358; 423/320

[56] References Cited

U.S. PATENT DOCUMENTS

| | | | |
|---|---|---|---|
| 1,941,886 | 1/1934 | Fischer et al. | 252/358 |
| 3,671,235 | 6/1972 | Yamaguchi et al. | 252/358 |
| 3,751,373 | 8/1973 | Lieberman et al. | 252/358 |
| 4,065,402 | 12/1977 | Satterwhite et al. | 252/358 |

FOREIGN PATENT DOCUMENTS 531776 10/1956 Canada .................................. 252/321

*Primary Examiner*—Benjamin R. Padgett
*Assistant Examiner*—Deborah L. Kyle
*Attorney, Agent, or Firm*—Donald L. Traut

[57] ABSTRACT

A defoamer for controlling the foam in high strength acid media and process for preparing same having a majority of a sulfonated oil and a minority of a long chain alcohol.

11 Claims, No Drawings

DEFOAMER FOR HIGH STRENGTH ACID MEDIA

This is a continuation of application Ser. No. 664,595, filed Mar. 8, 1976, now abandoned.

BACKGROUND OF THE INVENTION

1. Field of the Invention

The invention is related to a surface active material, a defoamer. More particularly, this invention provides a defoamer and process for preparing same which controls the foam in high strength acid media from petroleum products.

2. Description of the Prior Art

Conventional defoamers contain sulfonated tall oil-fatty acids. Some are produced from a refined oleic acid while others are produced from tall oil. The primary application of these defoamers is in the phosphate industry to control the foam in the digestion and concentration stages of wet-process phosphoric acid manufacture. In recent years cost of conventional defoamers has drastically increased because of the high cost of raw materials utilized in their manufacture. Therefore, what is needed and what has been invented by us is a novel defoamer which is not only low in cost but is also more effective than the conventional defoamers being marketed.

SUMMARY OF THE INVENTION

It is therefore an object of this invention to provide a defoamer and a process for preparing same.

It is yet another object of this invention to provide a defoamer which is economical to prepare and is more effective than conventional defoamers.

These and other objects will become apparent to those skilled in the art as the following description proceeds.

The foregoing objects are achieved in accordance with this invention. Broadly, this invention is a defoamer and process for preparing same for controlling the foam in high strength acid media from petroleum products which comprises a majority of a sulfonated oil and a minority of a long chain alcohol.

DETAILED DESCRIPTION OF THE INVENTION

The composition of matter of this invention is a defoamer for controlling the foam in high strength acid media which broadly comprises a majority of a sulfonated oil and a minority of a long chain alcohol. The oil may be any petroleum feedstock, mineral oil, fuel oils and/or lubricants derived from petroleum and its products including hydrocarbons. A preferred oil is one having a viscosity at 100° F. of between about 5 N SUS and 1000 N SUS. The oil is sulfonated by mixing it with a mixture of $SO_3$ and $SO_2$ at a temperature of between about −20° F. and 212° F. A preferred temperature is room temperature (i.e. about 72° F.). The $SO_3$ is much too reactive alone; therefore, $SO_2$ is utilized to pacify the reaction. The $SO_2$ doesn't enter into the reaction of the $SO_3$ and oil but merely acts as a diluent and coolant for the strong oxidizing tendencies of the $SO_3$. The alcohol is used to disperse and/or dissolve the acid sludge. The alcohol not only disperses the sludge but also permits the formation of a synergistic product to produce a defoamer which is several fold more effective than the sulfonate or the alcohol alone. The alcohol may be any alcohol that is soluble in the sulfonated oil. Preferably the alcohol may be any straight or branched cycle or linear long chain alcohol having between about 4 and 20 carbon atoms. More preferably the alcohol has between about 8 and 14 carbon atoms. Most preferably the alcohol is dodecyl alcohol.

The sulfonation ratio of $SO_3$ to oil may broadly be from about 0.025:1 to about 0.60:1. The more preferred sulfonation ratio of $SO_3$ to oil is from between about 0.1:1 to about 0.3:1, most preferably, the ratio is about 0.25:1.

The ratio of alcohol to the sulfonated oil may broadly be from about 0.025:1 to about 0.75:1. The more preferred ratio of alcohol to sulfonated oil is from between about 0.25:1 to about 0.50:1; most preferably, the ratio is about 0.38:1.

In the process for preparing the defoamer the oil is sulfonated with a minority of $SO_3$ dissolved in a majority of $SO_2$. The mixing ratio of $SO_3$ to $SO_2$ may be any suitable ratio such that $SO_2$ quiesces the reactive $SO_3$. Preferably $SO_3$ and $SO_2$ are mixed in a ratio of from approximately 1:1 to about 1:10. During the course of the reaction of the oil and the $SO_3$, $SO_2$ mixture, the temperature decreases. The mixture is preferably allowed to react from between about 15 minutes and 90 minutes whereafter the reacted product is a mixture of sulfonated oil and an acid sludge. The alcohol is subsequently added to the sulfonated oil to disperse the sludge. After the admixing of the alcohol to the sulfonated oil, the mixture is blended from between about 15 mins. and 90 minutes. It should be noted that the 90 minute upper limitation on the reaction time of the oil and $SO_3$, $SO_2$ mixture, and the sulfonated oil and alcohol mixture is not to be construed as an unduly limitation. Longer reaction times would be superfluous because the reactions are completed after about 15 minutes.

In the following is set forth examples of our invention which are given by way of illustrations and not by limitations. The specific concentrations, temperatures, times, compounds, etc., set forth in these examples are not to be construed to unduly limit the scope of the invention.

EXAMPLE 1

Four hundred grams of a neutral lube oil having a viscosity of 350 N SUS at 100° F. were sulfonated at room temperature with 100 gms of liquid $SO_3$ dissolved in 500 gms of liquid $SO_2$. During the course of the reaction, the temperature decreased to −10° F. The mixture was allowed to react for ½ hour at which time the temperature rose to 70° F. The product was then heated to 140° F. to strip residual $SO_2$. The reacted product was a mixture of sulfonated oil and sludge. Dodecyl alcohol was added to the mixture to disperse the sludge. The alcohol was added in a ratio of 300 grams of alcohol to 500 grams of sulfonated oil. The mixture was blended for 30 minutes at 140° F. to insure complete dispersion of the sludge. An acceptable alternative is to add the alcohol along with the lube oil before sulfonation.

This defoamer was added periodically to a reactor having a continuous flow of phosphate rock, 60% $H_2SO_4$, and recycled phosphoric acid (25% $P_2O_5$) in order to control the foaming. This defoamer was proved to be superior to conventional defoamers on a cost/ton of $P_2O_5$ basis and defoamer requirements/ton of $P_2O_5$ as evidenced in the following Table I:

Table I

|  | Defoamer Requirements per ton P₂O₅ (lbs./ton) | Cost per Ton P₂O₅ ($) |
|---|---|---|
| Applicants' Defoamer | 2.59 | .58 |
| Conventional Defoamers including tall oil, fatty acids, by-products of paper industry: | | |
| Brand A | 4.00 | 0.70 |
| Brand B | 2.87 | 0.65 |
| Brand C | 4.68 | 1.24 |
| Brand D | 6.62 | 1.16 |
| Brand E | 4.18 | 6.94 |
| Brand F | 9.60 | 1.63 |
| Brand G | 4.66 | 0.98 |

EXAMPLE 2

Four hundred grams of a neutral lube oil having a viscosity of 350 N SUS at 100° F. were sulfonated at room temperature with 130 grams of liquid $SO_3$ dissolved in 650 grams of liquid $SO_2$. During the course of the reaction, the temperature decreased to −10° F. The mixture was allowed to react for 1 hour at which time the temperature rose to 85° F. The product was then heated to 120° F. to strip residual $SO_2$. The reacted product was a mixture of sulfonated oil and acid sludge. Dodecyl alcohol was added to the mixture to disperse the sludge. The alcohol was added in a ratio of 318 grams alcohol to 400 grams of sulfonate. The mixture was agitated for 30 minutes to insure complete dispersion of the sludge. Subsequently the defoamer was tested and compared to conventional defoamers in accordance with Example I and similar results were found.

EXAMPLE 3

Four hundred grams of a neutral lubricating oil having a viscosity of 350 N SUS at 100° F. were sulfonated at room temperature with 80 grams of liquid $SO_3$ dissolved in 400 grams of liquid $SO_2$. During the course of the reaction, the temperature dropped to −10° F. The mixture was allowed to react for 45 minutes at which time the temperature of the mixture rose to 60° F. The reacted product was a mixture of sulfonated oil and acid sludge. Dodecyl alcohol was added to the mixture to disperse the sludge. The alcohol was added in a ratio of 288 grams of alcohol to 480 grams of the sulfonate. The mixture was stirred at room temperature for 30 minutes to insure complete dispersion of the sludge. Subsequently the defoamer was tested and compared to conventional defoamers in accordance with EXAMPLE I and similar results were found.

EXAMPLE 4

Repeat Examples 1–3, but vary the mixing ratios of $SO_3$ to oil in 0.005 increments between 0.025 and 0.400 and find similar results.

EXAMPLE 5

Repeat Examples 1–4 but vary the type of alcohol (both straight chain and branched) linear or cyclic in 1 carbon atom increments between 4 carbon atoms and 20 carbon atoms and find similar results.

EXAMPLE 6

Repeat Examples 1–5 but vary the sulfonation temperature in increments of 5° F. between −20° F. and 212° F. and find similar results.

EXAMPLE 7

Repeat Examples 1–6 but vary the mixing ratio of the alcohol to the sulfonated oil in increments of 0.005 between 0.025 and 0.750 and find similar results.

EXAMPLE 8

Repeat Examples 1–7 but vary the mixing ratio of the $SO_3$ to $SO_2$ in increments of 1:1 between 1:1 to 1:10 and find similar results.

EXAMPLE 9

Repeat Examples 1–8 but lower the reaction time of $SO_3$ and $SO_2$, and the agitation time of sulfonated oil and alcohol to 15 minutes and find similar results.

EXAMPLE 10

Take the sulfonated oil of EXAMPLE 1 and the alcohol of EXAMPLE 1 and test the defoamer requirements of each and synergistically compare with the defoamer of EXAMPLE 1. Find the following synergistic results:

Table 2

|  | Defoamer Requirements per ton P₂O₅ | Cost per ton P₂O₅ |
|---|---|---|
| Sulfonated oil | 7.52 | 1.88 |
| Alcohol | 6.03 | 1.20 |
| Applicants' Defoamer | 2.59 | 0.58 |

EXAMPLE 11

Repeat EXAMPLE 10 in accordance with each procedure of EXAMPLES 2–9 and find the similar results given in EXAMPLE 10.

While the present invention has been described herein with reference to particular embodiments thereof, and specific examples, a latitude of modifications, various changes and substitutions are intended in the foregoing disclosure, and in some instances some features of the invention will be employed without a corresponding use of other features without departing from the scope of the invention as set forth.

We claim:

1. A defoamer for controlling the foam in high strength acid media comprising:
    (a) from about 57.1 wt % to about 97.6 wt % of sulfonated petroleum oil; and
    (b) the balance of an alcohol having from about 4 to about 20 carbon atoms.

2. The defoamer of claim 1, wherein said alcohol comprises a linear alcohol of from about 8 carbon atoms to about 14 carbon atoms.

3. The defoamer of claim 1 wherein said alcohol comprises a branched chain alcohol about 8 carbon atoms to about 14.

4. The defoamer of claim 2, wherein said alcohol comprises dodecyl alcohol.

5. The defoamer of claim 2, wherein said sulfonated oil comprises about 66.7 wt % to about 80 wt %.

6. A process for preparing a defoamer for controlling the foam in high strength acid media comprising mixing from about 57.1 wt % to about 97.6 wt % of a sulfonated petroleum oil with the balance an alcohol having from about 4 to about 20 carbon atoms.

7. The process of claim 6 wherein said alcohol comprises a linear alcohol of from about 8 carbon atoms to about 14 carbon atoms.

8. The process of claim 6 wherein said alcohol comprises a branched chain alcohol of from about 8 carbon atoms to about 14 carbon atoms.

9. The process of claim 7 wherein said alcohol is dodecyl alcohol.

10. The process of claim 6 wherein said sulfonated oil comprises from about 66.7 wt % to about 80 wt %.

11. The process of claim 6 additionally comprising agitating said mixture of sulfonated oil and alcohol for at least 15 minutes immediately after adding said alcohol to insure complete dispersion of acid sludge resulting from sulfonation of the oil.

* * * * *